UNITED STATES PATENT OFFICE.

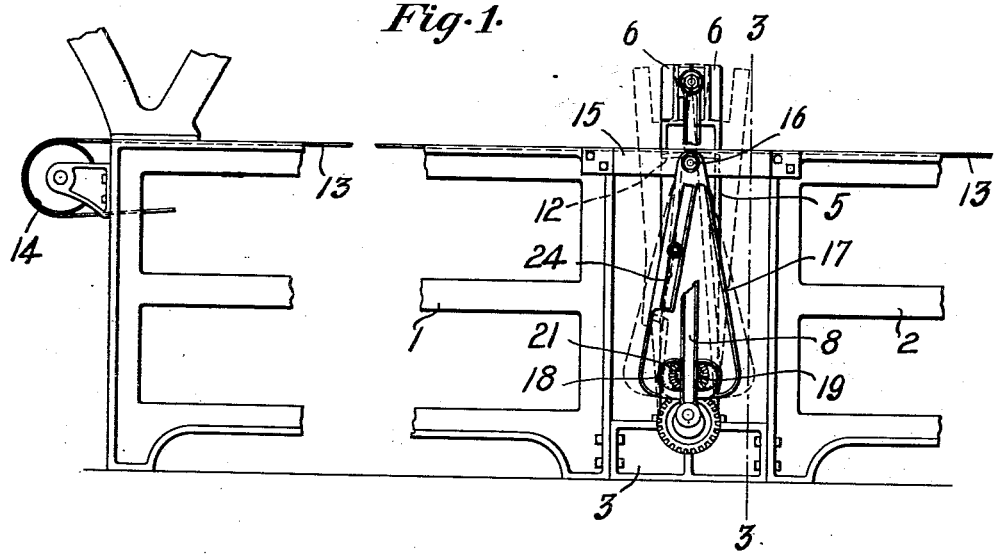
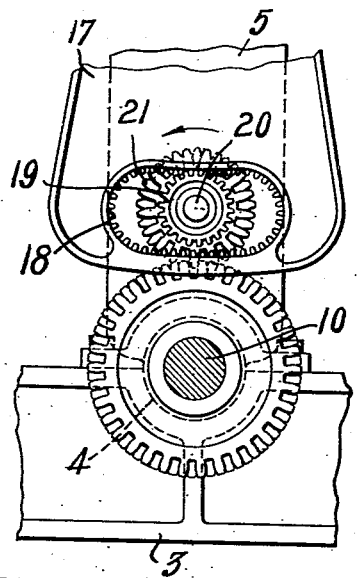
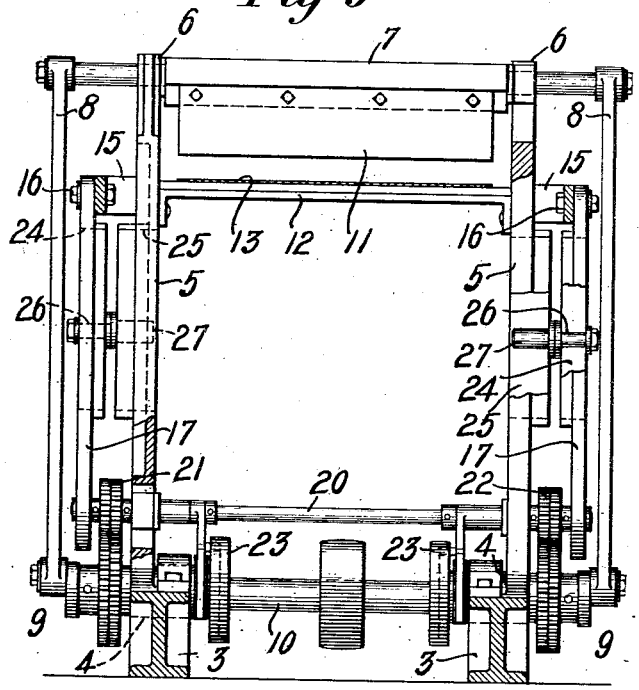

THOMAS L. GREEN, OF INDIANAPOLIS, INDIANA.

MACHINE FOR CUTTING ARTICLES FROM PLASTIC MATERIAL.

1,172,520.   Specification of Letters Patent.   Patented Feb. 22, 1916.

Application filed June 4, 1908. Serial No. 436,585.

*To all whom it may concern:*

Be it known that I, THOMAS L. GREEN, a citizen of the United States, and a resident of Indianapolis, in the county of Marion and State of Indiana, have invented an Improvement in Machines for Cutting Articles from Plastic Material, of which the following description, in connection with the accompanying drawings, is a specification, like letters on the drawings representing like parts.

This invention relates to machines for severing, cutting, or cutting out articles from, or forming impressions in a mass or sheet of plastic or other material, usually in sheet form. Machines of this type are commonly used in making bricks from the plastic clay material, and also in the making of crackers and other bakery and confectionery products, from dough or equivalent plastic material.

My invention aims to improve the construction and operation of machines of this type, for the purpose of simplifying, improving and cheapening the cost of construction thereof, and of improving and increasing the output.

To this end, my invention consists in the various features of arrangement, construction and combination hereinafter disclosed.

For the purpose of the present disclosure, I will describe one embodiment of my invention in connection with a machine for operating upon dough or other baker's or confectioner's plastic material, it being understood, however, that my invention is not thereby limited to such machine nor to such use.

In the accompanying drawings: Figure 1, in side elevation, shows a sufficient portion of a machine of the kind referred to to enable my invention to be understood; Fig. 2 is a similar view, on an enlarged scale; and, Fig. 3, a vertical, transverse section, on the dotted line 3—3 of Fig. 2, showing also the cutter operating connections.

In the particular embodiment of my invention selected for illustration herein and shown in the drawings I have indicated such parts only of the machine frame as are necessary for the purposes of the present disclosure, the parts shown being portions of the end sections of the frame indicated at 1 and 2, and a connecting lower portion 3.

The middle frame portions 3 have suitable bearings for the trunnions 4 on the U shaped segmental cutting frame 5, mounted to oscillate in said bearings and provided at its opposite ends with the upwardly extended guides 6 for the cutter head 7. This cutter head is actuated in said guides by connecting rods 8, extended downwardly to and operated by cranks 9 on the opposite ends of a crank shaft 10, loosely journaled in and concentrically with said trunnions 4 of the cutting frame, so that the crank shaft rotates and the cutting frame oscillates about one and the same axis within the bearings on the frame portions 3.

The cutter head 7 may be provided with a cutter or cutters, embosing or other die or dies, or any other suitable tool or device, for cutting, impressing, or otherwise acting upon or treating the material passed beneath it. I have herein shown said head as provided with a single, straight cutting knife 11, adapted to sever from side to side a sheet or several bars of plastic material passed beneath it, said cutter or any other device or die used in its place acting upon or in opposition to a suitable cutter plate 12, mounted in or on said oscillatory cutting frame 5.

The material to be acted upon or cut, which for the present purposes will be assumed to be a pastry or other dough, may be prepared in usual manner and delivered to or by the machine in sheet form or in bars, upon a suitable carrier or carriers, herein an endless apron, a portion only of which is indicated at 13, the same being mounted in usual manner and driven, preferably continuously, and at a uniform rate of speed. The carrier driving means is typified at the left, Fig. 1, by the roller 14. In practice, when an endless apron is used it is carried forward over the cutting plate 12, and between the latter and the knife or knives above it, and on to the opposite end of the machine, where the articles formed or acted upon are removed or deposited upon pans or receptacles in any desired manner.

Since the apron upon which the plastic material is deposited moves continuously, it is important that the cutter or its equivalent device or devices be given a forward movement in the direction of travel of the apron during so much of the cutting period as may be necessary to avoid mutilating, distorting, or in any wise impairing the articles or material acted upon.

To this end, the cutting frame 5 is made to oscillate about the axis of the crank shaft as described, the arc through which the cutting plate 12 travels being of such radius that the difference in direction of movement between said plate and the cutter above it and the apron 13, if the latter be fed in a straight line past it, is immaterial.

In ordinary practice, the weight of the cutting plate and its support, and of the cutter, cutter head and actuating connections, made necessary largely because of the excessive pressure required in cutting or embossing wide sheets of plastic material, has made it difficult to obtain proper means for providing these movements. Attempts have been made to obtain these movements from an ordinary crank, but the crank motion has been found to be seriously defective in this respect, soon pounding and wearing itself into a condition which impairs the usefulness of the machine. Furthermore, a crank motion does not produce a uniform travel from beginning to end, nor in fact during any considerable portion of its stroke, so that at best only an approximation has been obtained to the uniformly continuous travel of the apron.

I have eliminated the objections to a crank motion by the means here disclosed and involving my invention, which I will now describe.

Spanning the space between the end frame portions 1 and 2 at each side of the machine are the bridge members 15, provided intermediate their lengths with pivot studs 16, from which depend the gear segments 17. These gear segments, near their lower ends, are provided with segmental slots 18, the walls of which are cut to present gear teeth, in mesh with the pinions 19 at opposite ends of a shaft 20. This shaft 20 is driven directly from the crank shaft 10 by suitable means, herein shown as the well-known finger type of gears 21, 22, which will permit said shaft 20 and its gears 19 to be raised and lowered, to cause said pinions to mesh alternately with the gear teeth at the top and bottom sides of said segmental slots 18, thereby to cause said segments 17 to be oscillated in the direction of the length of the apron. The shaft 20, carrying said pinions 19, is here shown as raised and lowered at the proper times by cams 23 on the crank shaft 10.

The gear segments 17 are respectively provided with the radial slots 24, and the U shaped cutting frame 5 is provided with corresponding slots 25, the said segments and cutting frame being connected through these slots by clamp studs 26, adapted to be clamped in adjusted positions in and along the slots 24 in the segments 17 and provided, respectively, with roller studs 27 which project into the slots 25 in the cutting frame 5. Thus, oscillations of the segments 17 by the pinions 19 referred to will cause corresponding oscillations of the cutting frame 5, together with the cutters and cutting plate thereon. By varying the adjustment of the clamp studs 26 in and along the slots 24 the extent of oscillation of the cutting frame may be varied to any desired degree relative to the fixed oscillations of the segments 17; that is to say, the said cutting frame may be caused to travel either a greater or less distance between successive movements of the cutter, according as the travel of the apron relative to the speed of the rotation of the crank shaft 10 is varied to carry the sheet of material greater or less distances between successive cuts, to produce cakes or articles of varying lengths, or of larger or smaller size.

Since the pinions 19 rotate continuously and at a uniform rate, being driven from the crank shaft 10, it is clear that the oscillations of the segments 17 will be uniform from substantially the beginning to the end of the travel in either direction, consequently the oscillations of the cutting frame 5 will always be uniform from one to the other limit of oscillation, whatever the extent or length of the oscillation may be. This is important because it is thereby possible to vary the length of travel of the cutting or embossing means between the cuts or strokes thereof to follow closely the variable distance through which the apron may travel during corresponding periods, and, at the same time it is possible to utilize the cutting or embossing means for work during the entire period of forward travel. It is therefore possible to operate upon thicker material with a machine equipped with my invention than would be possible where the mechanism is constructed to provide a forward movement of the cutter in unison with the apron for a short distance only.

The mechanism described thus provides a simple, crank-actuated, reciprocatory movement for bringing the cutter or embossing means down upon and to remove it from the sheet of plastic material upon the apron, and where uniformity of movement throughout the stroke is not of importance. My improved mechanism, however, provides a horizontal travel in the direction of travel of the carrier, which is uniform throughout, whatever the rate or extent of movement may be, contradistinguished from the variable, crank-operated movement which it has heretofore been attempted to use.

It will be observed that the entire cutting mechanism is self-contained and oscillates as a unit about the axis of the crank shaft as a center, and that the pressure resulting from the cutting action does not increase the burden of oscillation. My invention insures greater uniformity of cut or work than has heretofore been possible and, by reducing the energy required to advance the cutting mechanism with and to follow the apron, makes it possible to increase the number of such movements in a given time, thereby to increase the output of the machine.

The terms "cutter" and "cutting means," as used in the claims, are intended to be generic to any form of cutting or embossing device or devices, or tool of any sort employed to act upon the material caused to travel past or relative to it.

My invention is not limited to the particular embodiment herein illustrated nor is it limited to any particular use.

Claims—

1. A machine of the class described comprising in combination an apron, an oscillatory support, a bed plate mounted on said support and movable therewith, a reciprocating cutter carried by said support, and means for oscillating said support to cause said cutter and bed plate to travel in unison with said apron throughout the active cutting operation of said cutter.

2. A machine of the class described comprising in combination an oscillatory support having guideways therein, a cross-head, a cutter carried by said cross-head, a bed plate carried by said oscillatory support, means for reciprocating said cross head to move said cutter toward and from said bed plate, and means for oscillating said support to cause said cutter and bed plate to move a substantial distance in unison with an apron between them throughout the active cutting operation of the cutter.

3. A machine of the class described comprising in combination a frame, a shaft journaled therein, supporting arms mounted to oscillate about said shaft, a cross-head connecting and guided by said arms, a cutter carried by said cross-head, means connecting said shaft with said cross-head to reciprocate the latter, a bed plate connecting and supported by said arms, and means for oscillating said arms to cause the cutter to travel a substantial distance in unison with an apron between them.

4. The combination of an oscillatory support, a cross-head guided therein, a cutter on said cross-head, a bed plate carried by said support, a carrier, and means for causing said cutter and bed plate to travel in unison with said carrier throughout a substantial distance and having provision for varying said distance.

5. A machine of the class described comprising in combination, an oscillatory support, a reciprocating cutter and a bed plate carried by said support, means for reciprocating said cutter, a carrier adapted to be fed between said cutter and plate, and means for causing said cutter and plate as a unit to move a substantial distance in unison with the carrier.

In testimony whereof, I have signed my name to this specification, in the presence of two subscribing witnesses.

THOMAS L. GREEN.

Witnesses:
  FREDERICK L. EMERY,
  EVERETT S. EMERY.